US012485449B2

(12) United States Patent
Graves

(10) Patent No.: US 12,485,449 B2
(45) Date of Patent: Dec. 2, 2025

(54) PERSONALIZED MARKING APPARATUS, SYSTEM AND METHOD FOR CONTAINER IDENTIFICATION

(71) Applicant: Corey Albert Graves, Jamestown, NC (US)

(72) Inventor: Corey Albert Graves, Jamestown, NC (US)

( * ) Notice: Subject to any disclaimer, the term of this patent is extended or adjusted under 35 U.S.C. 154(b) by 41 days.

(21) Appl. No.: 18/348,466

(22) Filed: Jul. 7, 2023

(65) Prior Publication Data

US 2024/0009695 A1 Jan. 11, 2024

Related U.S. Application Data

(60) Provisional application No. 63/359,011, filed on Jul. 7, 2022.

(51) Int. Cl.
*B05C 5/02* (2006.01)
*B05C 11/10* (2006.01)

(52) U.S. Cl.
CPC .................................. *B05C 5/0212* (2013.01)

(58) Field of Classification Search
USPC ................. 118/712, 713, 313–315, 679–682
See application file for complete search history.

(56) References Cited

U.S. PATENT DOCUMENTS

| | | | | |
|---|---|---|---|---|
| 7,294,204 | B2 * | 11/2007 | Hong | E01C 23/22 118/679 |
| 2005/0150399 | A1 | 7/2005 | Wiley | |
| 2008/0193632 | A1 * | 8/2008 | O'Hara | B01J 2/006 118/712 |
| 2012/0118778 | A1 | 5/2012 | Lin | |
| 2014/0043421 | A1 | 2/2014 | Lindner | |
| 2022/0274729 | A1 | 9/2022 | Kelly et al. | |
| 2022/0315264 | A1 | 10/2022 | Krutchen et al. | |

FOREIGN PATENT DOCUMENTS

| | | | | |
|---|---|---|---|---|
| CN | 205920565 U | * | 2/2017 | |
| WO | WO-2018232749 A1 | * | 12/2018 | B67C 3/22 |
| WO | WO-2020149009 A1 | * | 7/2020 | B05C 5/00 |

OTHER PUBLICATIONS

English Translation CN-205920565-U (Year: 2017).*
English Translation WO-2018232749-A1 (Year: 2018).*
English Translation WO-2020149009-A1 (Year: 2020).*
GmbH, W3 digital brands. "Leibinger—Coding and Marking." Bottle Coder I Beverage Coding with Leibinger, leibinger-group.com/bottle-coder. Accessed Jul. 6, 2023.
Videojet. Beverage Brochure, 2022.

* cited by examiner

*Primary Examiner* — Yewebdar T Tadesse
(74) *Attorney, Agent, or Firm* — Dunlap Bennett & Ludwig, PLLC

(57) ABSTRACT

A method, a system, and apparatus for automatically marking beverage containers with various combinations of symbols to make them identifiable by their respective users in situations where multiple individuals are consuming beverages from otherwise identical containers. The apparatus includes a container detection space that is configured to sense a container placed therein, whereby the method is programmable so as to provide the unique identification marking to the sensed container. The system may include a storage bin that is integrated with the container detection space, and wherein the system provides an audible reminder whenever a container is sensed being removed from the storage bin by way of a storage access detector.

4 Claims, 5 Drawing Sheets

PERSONALIZED MARKING APPARATUS, SYSTEM AND METHOD FOR CONTAINER IDENTIFICATION

CROSS-REFERENCE TO RELATED APPLICATION

This application claims the benefit of priority of U.S. provisional application No. 63/359,011, filed 7 Jul. 2022, the contents of which are herein incorporated by reference.

BACKGROUND OF THE INVENTION

The present invention relates to marking apparatus, methods, and systems for container identification, more particularly, to an apparatus for personalized marking of a container, for example, a can or bottle, to avoid mistakenly consuming another's beverage or contents of the marked container.

At gatherings where people congregate, beverages frequently consumed from containers end up unattended at these gatherings. Absent a personal identification of their container, a person may mistake someone else's beverage container for their own, especially if the containers look alike, which they often do.

Because contagions are directly transferable by way of saliva as well as indirectly by germs along the outer surface of a container, a person consuming from the wrong container can become ill. This explains why many people simply discard the suspect container, opting for another one. However, discarding a perfectly good beverage is wasteful and morally questionable looking through the lens of wasting a resource like water that is a necessity of life (as well as wasting the material of the container). In sum, the problem in the above-mentioned settings is that consuming the contents of the wrong container may cause illness, while discarding it results in significant monetary loss.

As can be seen, there is a need for an apparatus, system, and method for marking containers with a personalized identification marking.

SUMMARY OF THE INVENTION

The present invention may include an apparatus providing a container detection area, which provides a method of sensing when a container is placed within said detection area. The apparatus selectively or randomly marks the detected or sensed container through implementation of one of a plurality of marking modes.

The present invention can be used to mark a variety of different single-serve containers. The various containers that it can mark include, but are not limited to, plastic bottles, glass bottles, aluminum cans, and wine glasses.

The container marking hardware can either be separate from the beverage container storage unit (though this is not shown in the appended Figures as such), or it can be totally contained within, or attached to, the beverage container storage unit or bin. It should also be noted that the beverage container storage unit can be a cooler, a refrigerator, a vending machine, or any device capable of storing a plurality of individual containers in need of personalized marking as disclosed herein.

The present invention may include a smart container storage unit enabled to provide individual container markings to each of the plurality of containers it stores, wherein the smart container storage unit automatically reminds a user to get a marking on the container whenever a container is sensed being removed from the smart container storage unit by way of a storage access detector.

It should also be understood that even though the disclosure frequently refers to beverage containers, the present invention contemplates use in other industries including the food container field, the medicament container field, or any field in which a large amount of confusingly similar looking containers are dispensed to a plurality of consumers.

The present invention may include a storage access detector implemented with a magnetic contact switch, where the magnet may be attached to the lid of the storage container, and the corresponding contact switch is affixed to the tub of the container. The magnet is separated from its contact switch whenever the lid is opened, which is detected by a bottle code controller module, which in turn activates a buzzer as a reminder that a beverage was taken out of the storage unit and should be marked by the system. When activated this way (i.e., by opening the lid) the marking buzzer can only be turned off by either (1) completing one of the possible bottle-marking modes, or (2) resetting the system (e.g., power-off/power-on cycle).

In one aspect of the present invention, a method of providing distinguishing markings on a plurality of containers housed in a storage unit, includes integrating the storage unit with an integrated container detection area/space; and in response from receiving an indication of a container within the container detection area/space, marking said container with a unique identifying sequence.

Another aspect of the present invention of the method of providing distinguishing markings to a container further includes the following: pre-programming each unique identifying sequence, wherein each unique identifying sequence is a product of a sequence of controlled air compressor, air valve, and ink sprayer nozzle actions; and further comprising outputting a visible marking indicator during said sequence, wherein the storage bin/unit has a lid movable between a closed condition and an open condition; and further comprising outputting an audible marking reminder during the open condition, and wherein the audible marking reminder is a product of an activation of a magnetic contact switch.

In yet another aspect of the present invention, an apparatus for providing distinguishing markings on a plurality of containers housed in a storage unit includes the following: a storage unit dimensioned to house a plurality of containers; a container detection space integrated to the storage unit; a container sensor configured to detect a container within the container detection space; and a plurality of programmable spray nozzles disposed adjacent to the container detection space so as to automatically provide distinguishing markings on said container sensed within the container detection space, wherein the sensor is a weight plate, wherein the container detection space integrated to the storage unit is disposed through an external portion of the storage bin/unit so that a container stored within the storage unit must first be removed from the storage unit to be placed in the container detection space, wherein a lid of the storage unit is movable between a closed condition and an open condition, and further comprising a storage access detector configured to output an audible reminder of the lid in the open condition; and further including an electronic control device operatively associated with each programmable nozzle so as to switch the distinguishing markings between multiple modes These and other features, aspects and advantages of the present invention will become better understood with reference to the following drawings, description, and claims.

DETAILED DESCRIPTION OF THE INVENTION

Figure 1:
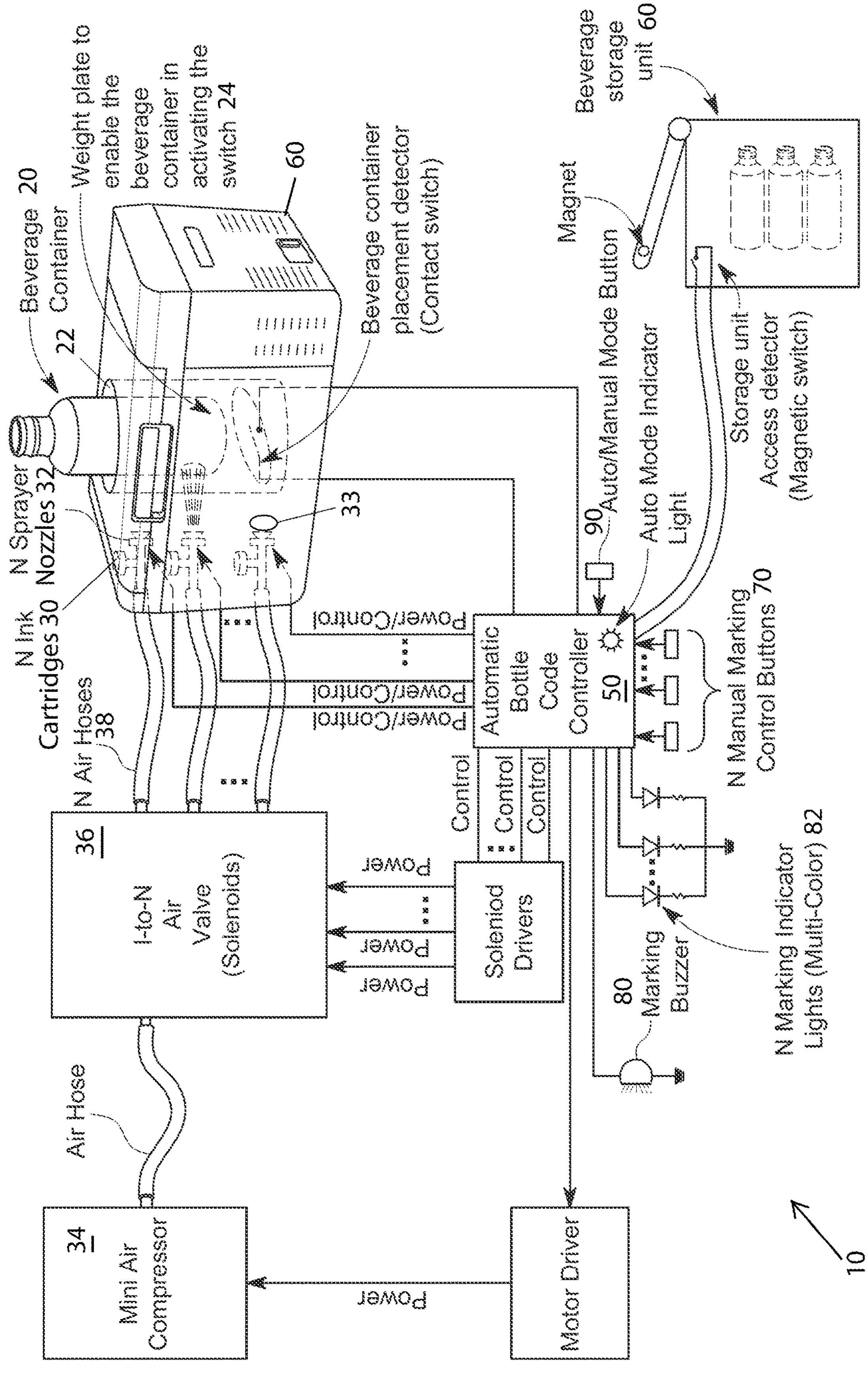
FIG. 1 is a schematic view of an exemplary embodiment of the present invention.
Figure 2A:
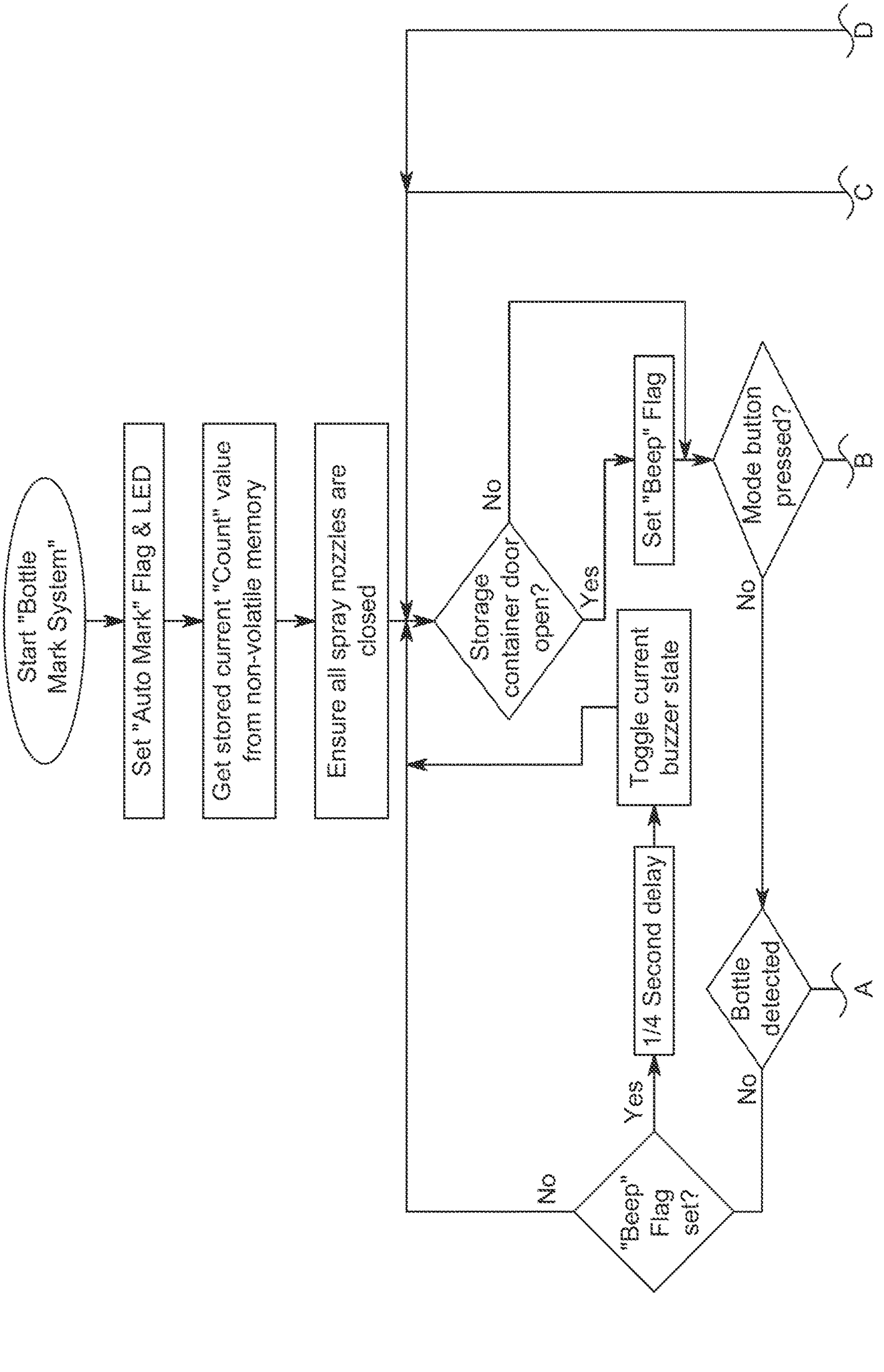
FIG. 2A is a flowchart regarding a marking system of an exemplary embodiment of the present invention (i.e., algorithm for the "Automatic Bottle Code Controller" of FIG. 1).
Figure 2B:
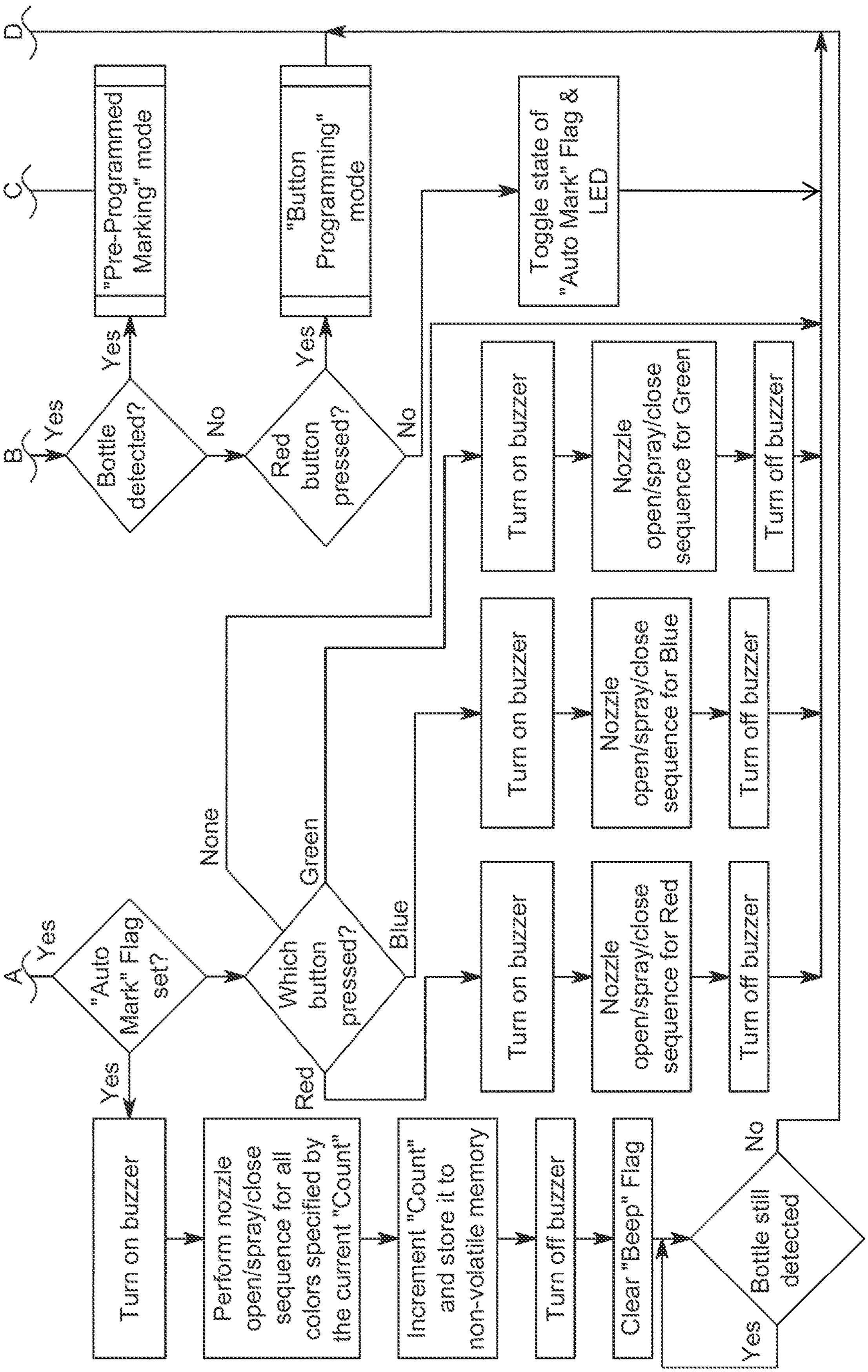
FIG. 2B is a continuation of FIG. 2A.
Figure 3:
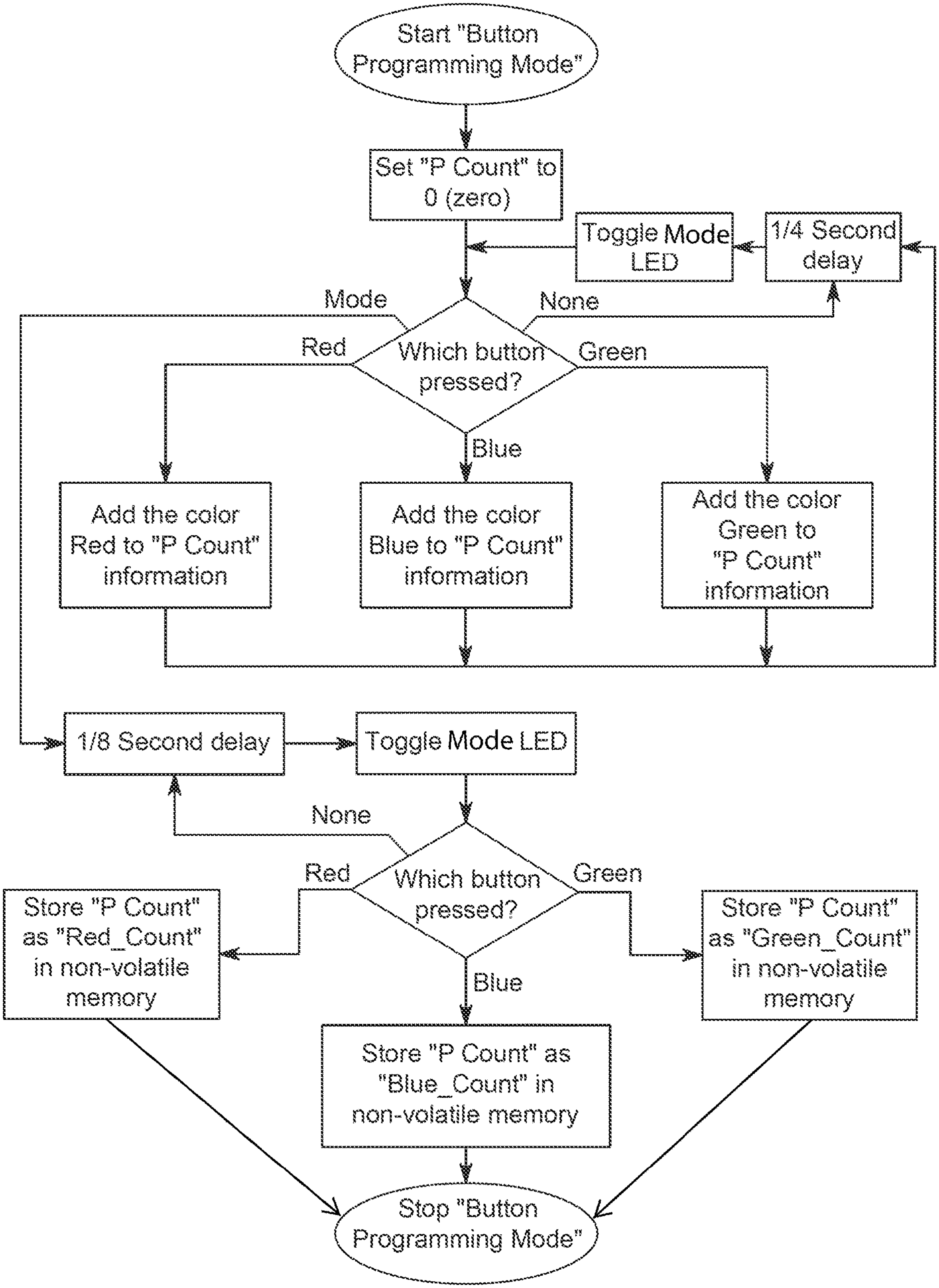
FIG. 3 is a flowchart for a Pre-Programmed Marking Mode of an exemplary embodiment of the present invention.
Figure 4:
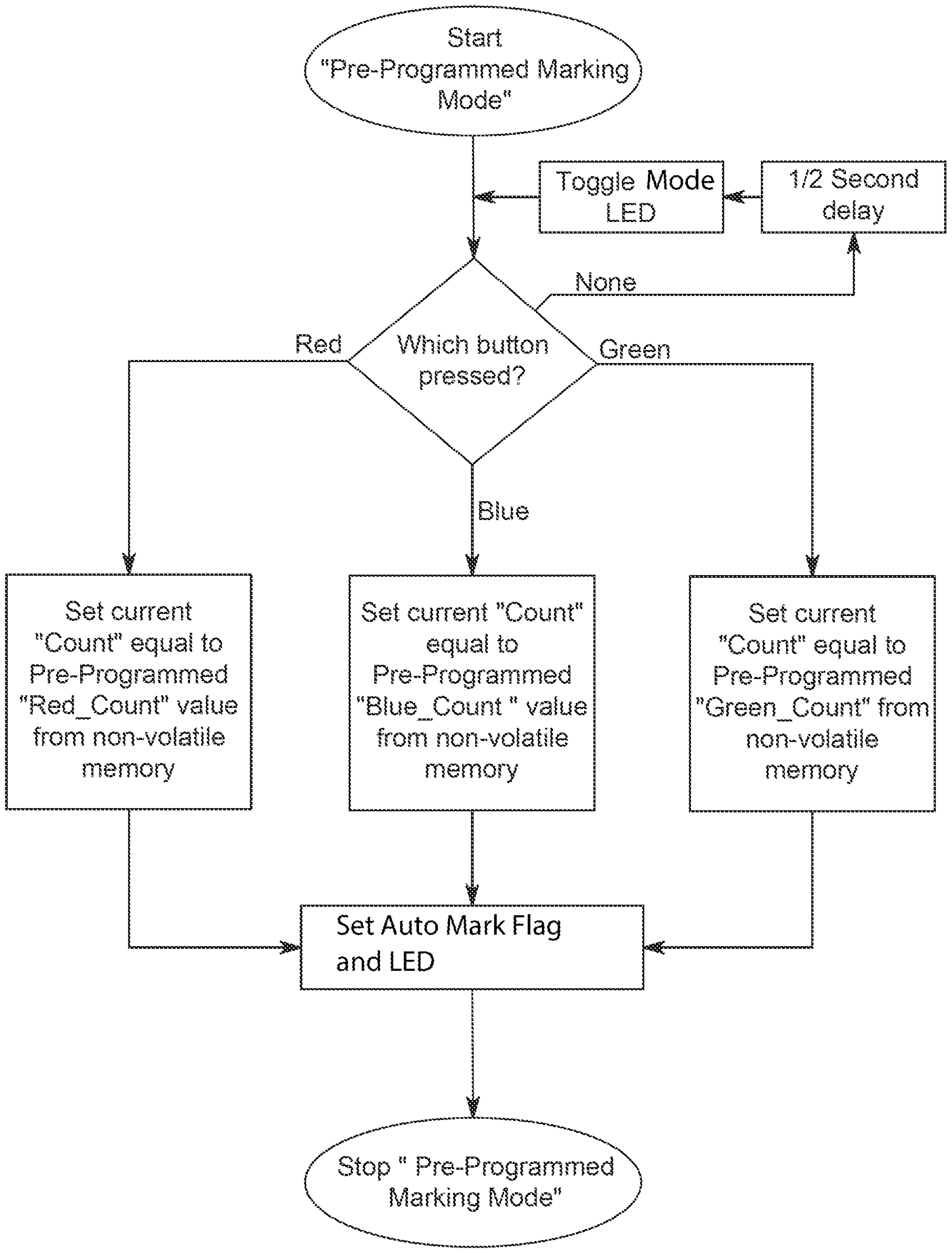
FIG. 4 is a flowchart for a Button Marking Mode of an exemplary embodiment of the present invention.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, an embodiment of the present invention provides an apparatus, system, and method for marking containers with personalized identification markings.

The present invention provides a plurality of marking modes, whereby apparatus 10 automatically marks a container 20 with an arrangement of symbols from a predetermined sequence of symbol arrangements. The symbol arrangements may be automatically generated on any given container. The symbol arrangements confer visual distinctiveness based on the symbol arrangements in view of previously marked containers (that were marked automatically by the apparatus 10).

In one embodiment, three symbols can be generated by the apparatus 10 for each detected container 20 sensed with a container detection area 22. These symbols may take the form of ink markings with the same or similar shape but with different color arrangements, though other arrangements can be implemented and still fall within the scope of the present invention.

The number of colored symbols, for some embodiments of the present invention, can be as many as the number of ink cartridges 30 (and supporting hardware) that can be physically arranged around the container detection area for a particular implementation. Each ink cartridge 30 may be connected to an ink sprayer nozzle 32 which can accept compressed air as input and can output an ink/air stream onto the container 20 when it is detected within the container detection area 22.

Container detection area 22 may be a void, space or volume formed into or attached as an adjunct to a storage unit 60 dimensioned and shaped to house a plurality of self-serve containers 20. The detection of a container 20 within the container detection area 22 may be done by one or more methods. One way is a switch plate 24, at the bottom of the container detection area 22 or space, wherein if the switch plate 24 is pressed or triggered by the weight of the container, the marking sequence is activated.

Each of the plurality ink sprayer nozzles 32 receives air from a single air compressor by way of a solenoid-controlled 1-to-N air valve 36, where N is the number of desired symbols (i.e., N=3 in a three-colors implementation). The valve's input and outputs are connected to the air compressor 34 and ink sprayer nozzles 32, respectively, via N+1 rubber air hoses 38. The solenoids for each of the N air valve outputs are controlled digitally by an electronic control device 50 which allows for only one of the valves to be open at a given time for delivering compressed air to the specified sprayer nozzle. In addition to the air valve solenoids, the electronic control device 50 actuates the on/off state of the air compressor 34, as well as the covering and uncovering of each ink sprayer nozzle 32 using a servo motor mechanism (to prevent the ink from drying out). A nozzle-covering 33 may include a piece of foam attached to a small servo arm, which is used to cover/uncover the nozzle 32 as needed. To prevent the foam/cover 33 from sticking to the nozzle 32 (due to ink residue) they may be soaked with oil as the sticking otherwise will prevent the servos from uncovering the nozzles 32 at times.

A "marking sequence" for a particular container may be characterized by a sequence of controlled air compressor 34, air valve 36, and ink sprayer nozzle 32 actions that are initiated either automatically by the container being placed in the container detection area 22, or manually by a user when they press a sequence of buttons, by way of the electronic control device 50, associated for the desired symbol sequence after a container 20 is placed in the detection area 22.

The present invention provides a "manual marking mode" (MMM) and an "automated marking mode" (AMM) which allow users to selectively mark symbol arrangements on the containers 20. AMM automatically marks each successive container with a unique identifying marking. Choices for container symbol arrangements in the basic MMM include those from the predetermined symbol arrangements used in the AMM, as well as customized symbol arrangements made by users at the time of apparatus usage. During the MMM, a color/symbol button or "pushbutton" 70 for each available symbol can be selectively activated.

A marking buzzer 80 may make a distinctive sound throughout the entire sequence of actions in AMM to let the user know that marking is not done yet. In both modes (AMM and MMM) one or more marking indicator lights 82, e.g., light-emitting diodes (LEDs), will light up after each container marking sequence is applied and the indicator lights 82 will output the exact same colors that the current container should have been marked with.

A user can toggle the device between AMM and MMM by pressing the mode select button 90 while there is no container 20 in the detection area 22. AMM is the default mode on power-up for the apparatus 10 and is indicated by the "Auto Mode Indicator Light being turned on (whereby in the MMM, the Auto Mode Indicator Light is off).

The present invention also includes a "programmed marking mode" (PMM) with an accompanying "button programming mode" (BPM). These two modes are described as follows:

The BPM feature allows a user to define a desired multi-symbol pattern to be associated with a single button press. In some embodiments, BPM may be activated by simultaneously holding down the mode select button 90 and a particular one of the pushbuttons 70. Once the two buttons are released, or the BPM is otherwise activated, the Auto Mode Indicator Light begins to flash "equality" with equal amount of on and off time, during which time the user can press as many of the pushbuttons that are desired in the programmed multi-symbol pattern. This may be deemed 'Phase 1' of the BPM.

Once all the desired colors and/or symbols are chosen by the user via their respective pushbuttons 70, then 'Phase 2' of the BPM can be implemented by pressing the mode select button 90 by itself. Once the mode select button 90 is released the Auto Mode Indicator Light begins to blink "rapidly" (wherein the Auto Mode Indicator Light is on more than it is of off) to prompt the user to press the pushbutton 70 to trigger the just-defined multi-symbol sequence when the system is in PMM. Once the user presses the desired trigger pushbutton 70, then the system exits BPM, whereby MMM is the default.

The PMM feature (i.e., one button-press, multi-symbol marking) enables selective entries on a per-container basis by holding down the mode select button while placing the container 20 in the marking/detection area 22. When this happens, the Auto Mode Indicator Light begins to flicker at a "slow rate", where the on time is much less than the off time. During this time, the user is allowed to press one of the N pushbuttons 70 programmed during BPM, at which time the system will mark the container with the most recently programmed symbol pattern for that button. Then the system exits PMM and is put into MMM by default.

The present invention contemplates a drying feature for containers 20 that may be wet before marking, wherein the drying feature may include an attached napkin holder, a built-in air dryer mechanism, or the like.

As used in this application, the term "about" or "approximately" refers to a range of values within plus or minus 10% of the specified number. And the term "substantially" refers to up to 80% or more of an entirety. Recitation of ranges of values herein are not intended to be limiting, referring instead individually to any and all values falling within the range, unless otherwise indicated, and each separate value within such a range is incorporated into the specification as if it were individually recited herein.

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. For the purposes of this disclosure, the term "above" generally means superjacent, substantially superjacent, or higher than another object although not directly overlying the object. Further, for purposes of this disclosure, the term "mechanical communication" generally refers to components being in direct physical contact with each other or being in indirect physical contact with each other where movement of one component affects the position of the other.

The use of any, and all, examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. An apparatus for providing distinguishing markings on a plurality of containers housed in a storage unit, the apparatus comprising:

the storage unit dimensioned to house the plurality of containers;

a container detection space integrated to the storage unit;

a container sensor configured to detect one of the plurality of containers within the container detection space; and a plurality of programmable spray nozzles disposed adjacent to the container detection space to automatically provide a sequence of distinguishing markings on said container sensed within the container detection space, wherein the storage unit is configurable between a closed condition and an open condition, and further comprising a storage access detector configured to output an audible reminder of the storage unit in the open condition.

2. The apparatus of claim 1, wherein the container sensor is a weight plate.

3. The apparatus of claim 1, wherein the container detection space is integrated to the storage unit and disposed through an external portion of the storage unit so that one of the plurality of containers container stored within the storage unit must first be removed from the storage unit to be placed in the container detection space.

4. The apparatus of claim 1, further comprising an electronic control device operatively associated with each programmable nozzle, wherein the electronic control device is configured to toggle between a manual mode and an automatic mode of said sequence of distinguishing markings.

* * * * *